United States Patent [19]

Fall et al.

[11] 4,302,951
[45] Dec. 1, 1981

[54] TORSIONAL VIBRATION DAMPER

[75] Inventors: Don R. Fall, Oxford; Paul E. Lamarche, Utica, both of Mich.

[73] Assignee: Borg-Warner Corporation, Chicago, Ill.

[21] Appl. No.: 106,593

[22] Filed: Dec. 26, 1979

[51] Int. Cl.³ .............................................. F16D 3/14
[52] U.S. Cl. .................................. 64/27 C; 192/106.1; 192/106.2
[58] Field of Search ................. 64/27 C, 27 CS, 27 F; 192/106.1, 106.2

[56] References Cited

U.S. PATENT DOCUMENTS

| | | | |
|---|---|---|---|
| 1,192,731 | 7/1916 | Batchelder | 192/106.2 |
| 2,149,887 | 3/1939 | Hickman | 192/106.2 |
| 2,574,573 | 11/1951 | Libby | 192/106.2 |
| 2,632,318 | 3/1953 | Meyer | 192/106.2 |
| 3,327,820 | 6/1967 | Maurice | 192/106.2 |

FOREIGN PATENT DOCUMENTS 166939  7/1921  United Kingdom ............... 64/27 C

Primary Examiner—Tony M. Argenbright
Attorney, Agent, or Firm—James A. Geppert

[57] ABSTRACT

A vibration damper assembly used in a torsional coupling between driving and driven members providing a low rate, high amplitude deflection, wherein the damper assembly includes a hub operatively connected to a driven shaft and having arms, at least one floating equalizer journalled on the hub, drive tangs connected to a driving member, and two or more groups of damper springs interposed between the drive tangs, hub arms and floating equalizers. To separate the damper springs in an equalizer, a spring separator or divider is mounted for limited arcuate movement in opposed arms of the equalizers.

10 Claims, 11 Drawing Figures

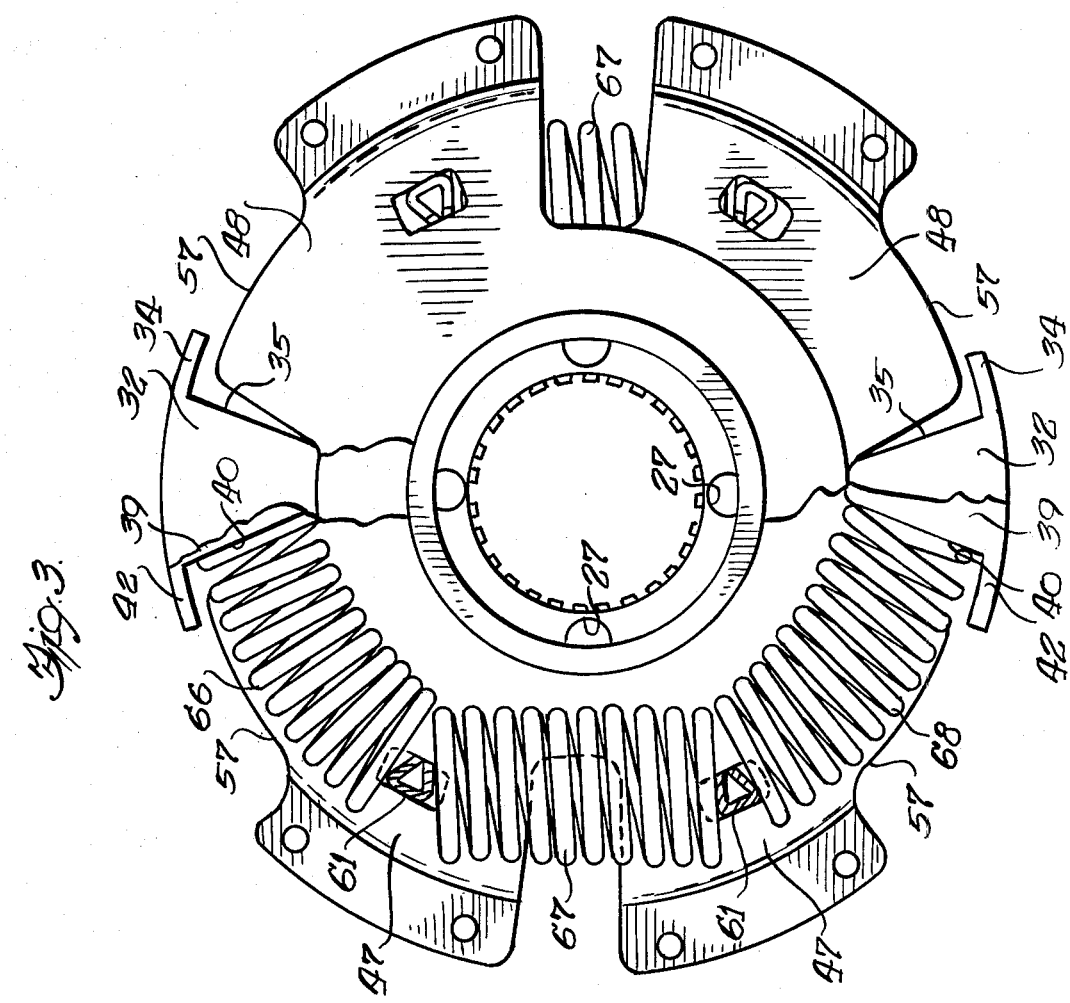
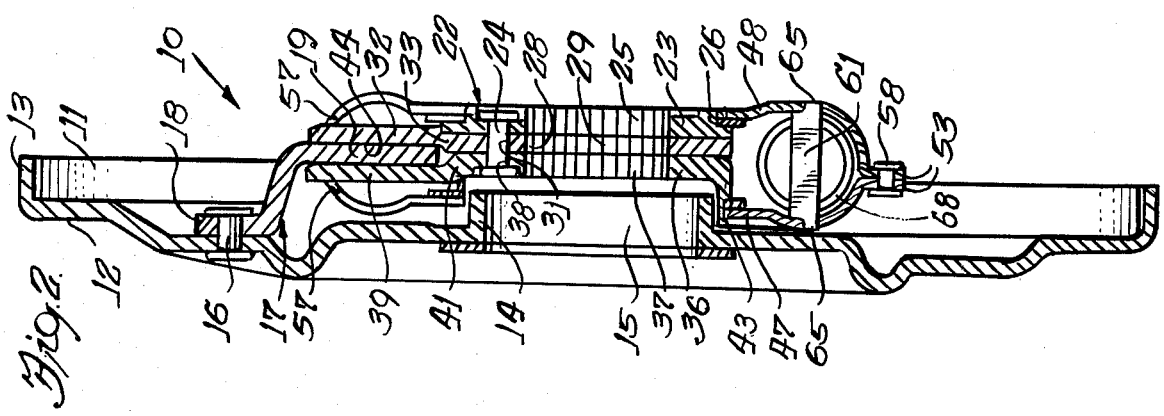

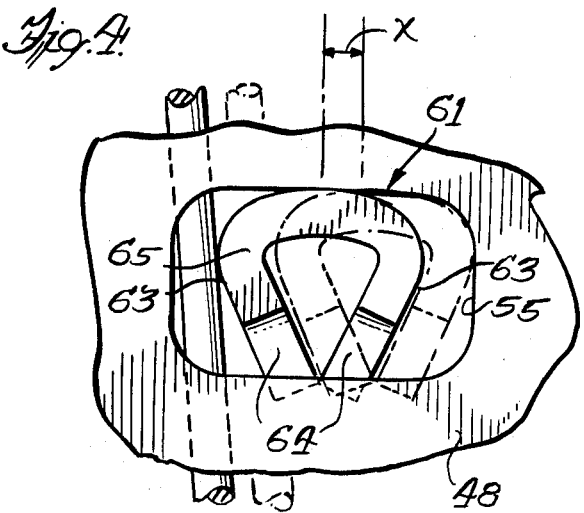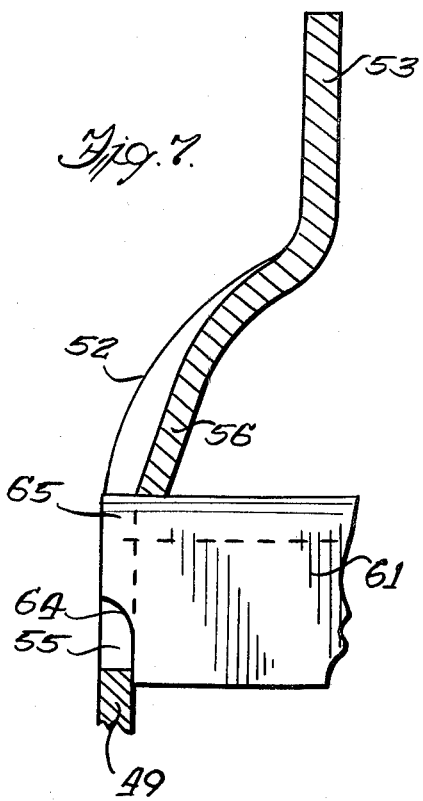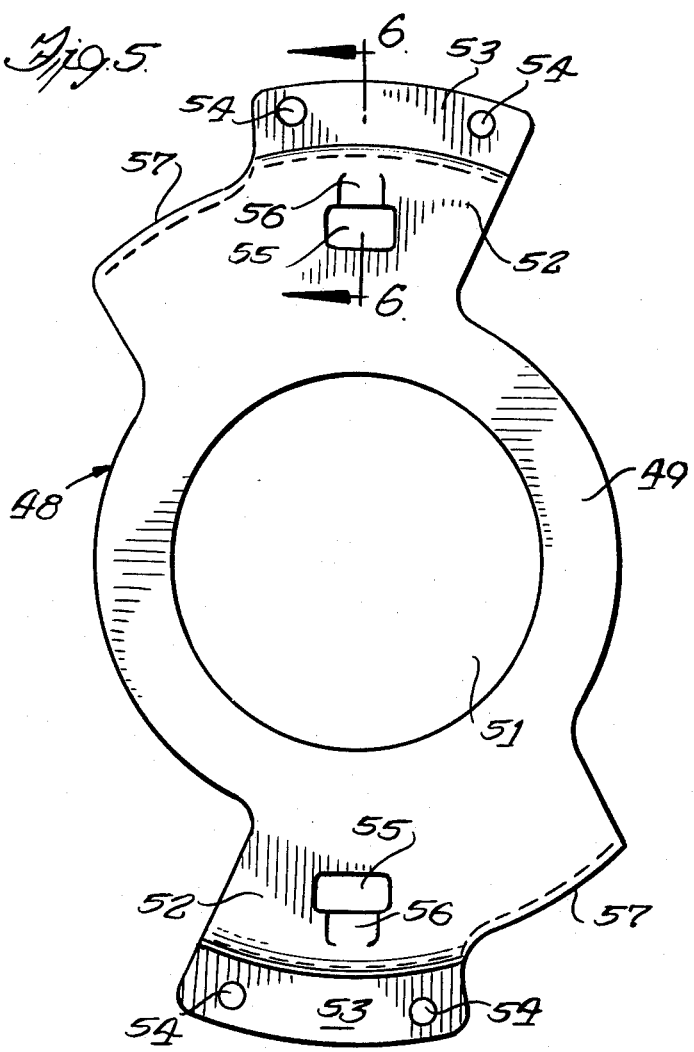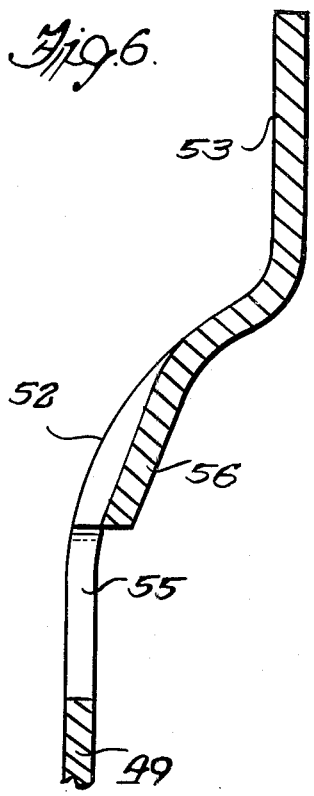

TORSIONAL VIBRATION DAMPER

BACKGROUND OF THE INVENTION

It is well known to use a vibration damper in a clutch assembly for a vehicle clutch ahead of a manually-operated transmission or in a torsional coupling between driving and driven shafts. Also, where a lock-up clutch is inserted into a torque converter of an automatic transmission, a vibration damper is necessary in the direct drive mode of the torque converter as the torsional vibrations will not be damped hydraulically.

In our earlier patent applications Ser. No. 801,989 filed May 31, 1977 now U.S. Pat. No. 4,188,805, and Ser. No. 860,348 filed Dec. 14, 1977, now U.S. Pat. No. 4,188,806, we disclosed torsional vibration dampers for various types of torsional couplings utilizing floating equalizers journalled on a hub connected to a driven shaft; such as a transmission input shaft. In each application two or more groups of springs operate in parallel with two or three spring sets in each group. In Ser. No. 801,989, the spring sets in each group are separated from each other to prevent rubbing and wear on the ends of the springs by the configuration of the arms of each floating equalizer. In Ser. No. 860,348, the arms of each equalizer provides a spring enclosure housing the ends of two adjacent spring sets and generally V-shaped locking dividers have tabs received in slots in the equalizer arms to retain the dividers therein and separate the springs.

SUMMARY OF THE INVENTION

The present invention relates to an improved spring separator or divider received in the oppositely disposed arms of a floating equalizer or transfer member. A self-locating divider is positioned in each equalizer arm to allow for any differences in damper spring set lengths. Each equalizer arm has axially aligned windows to receive the ends of the divider wherein each window can accumulate a relatively large variation in total length of the damper springs. The windows allow the divider to relocate and prevent uneven loading and a resultant possible failure mode.

The present invention also relates to an improved floating equalizer journalled on the hub of a torsional vibration damper which replaces a previous arrangement of two floating equalizers. The improved equalizer comprises a pair of plates joined together at pairs of oppositely disposed peripheral flanges and housing a substantial portion of the three spring sets in each of the two parallel groups. Two sets of axially aligned windows are located on each side of a centerline passing through the drive tangs and receive the ends of spring dividers. The windows are arcuate to allow a limited amount of movement of each divider under the force of the compressed springs when torque is applied to the assembly. Thus, both of the dividers are capable of movement along with the rotational movement of the equalizer.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 2 is a cross sectional view of the assembly taken on the irregular line 2—2 of FIG. 1.

FIG. 3 is a rear elevational view partially in cross section of the vibration damper removed from the piston plate input means.

FIG. 4 is an enlarged elevational view of a self-locating divider in an equalizer.

FIG. 5 is a rear elevational view of a plate to form a floating equalizer.

FIG. 6 is an enlarged partial cross sectional view taken on the line 6—6 of FIG. 5.

FIG. 7 is an enlarged partial cross sectional view similar to FIG. 6 but with a portion of a divider shown in elevation.

DESCRIPTION OF THE PREFERRED EMBODIMENTS

Figure 1:
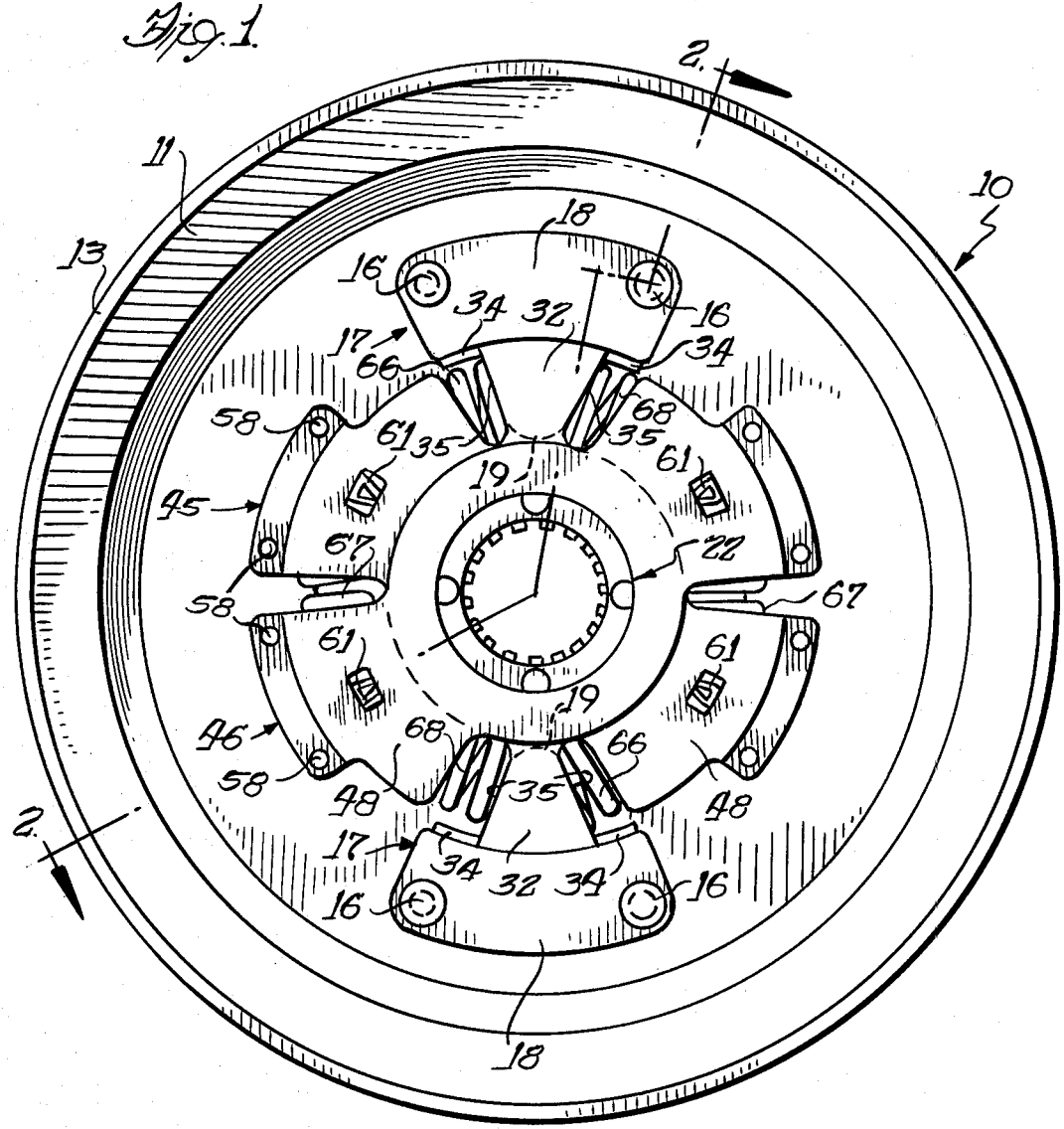
FIG. 1 is a rear elevational view of a torsional vibration damper assembly mounted on a piston plate of a torque converter lock-up clutch.

Referring more particularly to the disclosure in the drawings wherein are shown illustrative embodiments of the present invention, FIGS. 1 through 3 disclose a torsional vibration damper assembly 10 adapted for use in a lock-up clutch for a torque converter (not shown) wherein a piston plate 11 provides an annular friction surface 12 adjacent the outer periphery 13 and has an inner annular flange 14 defining a central opening 15. Secured to the piston 11, such as by rivets 16, are a pair of oppositely disposed drive tangs 17, each having a generally arcuate base 18 and an offset projection 19 extending inwardly into the damper. The projection has inwardly converging edges generally coinciding with the edges of the hub arms.

A hub assembly 22 of the damper includes a hub barrel 23 and first and second hub plates 28 and 36, respectively, secured together by rivets 24. The hub barrel has a generally cylindrical body internally splined at 25 and having a shoulder 26 for a purpose to be described later and counterbored openings 27 for the rivets 24. The first hub plate 28 includes a flat annular body internally splined at 29 and having openings 31 for the rivets. Extending outwardly are a pair of oppositely disposed arms 32 slightly offset at 33 and terminating in circumferentially extending lips 34. The arms have outwardly diverging edges 35 generally aligned with the edges of the drive tang projections 19.

The second hub plate 36 also has a generally annular flat body internally splined at 37 and provided with openings 38 for the rivets. A pair of oppositely disposed arms 39 extend from the body and are slightly offset at 41. The arms have diverging edges 40 (FIG. 3) terminating in circumferentially extending fingers 42 substantially identical to those of the first plate 28. Extending axially forwardly of the plate 36 are a pair of oppositely disposed arcuate flanges 43 (FIG. 2) formed with exterior shoulders. When assembled, the splines 25, 29 and 37 of the barrel and first and second hub plates are axially aligned to receive the splined end of a transmission input shaft (not shown), and the rivets 24 extend through axially aligned openings 27, 31 and 38 and are headed to secure the three parts together. As seen in FIG. 2, the arms 32 and 39 of the first and second hub plates 28 and 36, respectively, are offset in opposite directions to form circumferentially extending slots 44 receiving the inwardly extending projections 19 of the drive tangs 17 therein.

A pair of floating equalizers 45 and 46 are journalled on the shoulder 26 and shoulders of flange 43 of the hub assembly 22, with each equalizer being formed of front and rear plates 47 and 48, respectively, the rear plate being shown in FIG. 5. This plate 48 has a generally annular flat portion 49 with a central opening 51 journalled on the shoulder 26, and a pair of oppositely disposed slightly outwardly and then inwardly curved arms 52, 52; approximately one-half of the arm curving to a greater extent to terminate in a peripheral flange 53 having spaced openings 54. Formed in the curved arm is a slightly elongated window 55, and an indented portion 56 is located immediately outwardly of the window. The remaining portion of the arm provides a curved edge 57 adapted to receive the hub arms 32, 39 in a manner to be later described.

Figure 8:
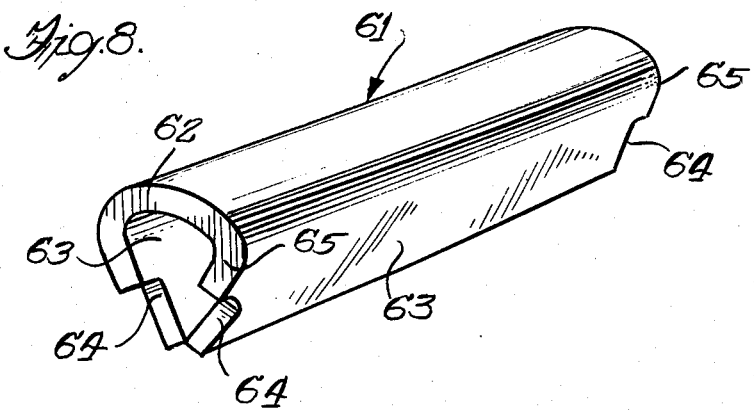
FIG. 8 is an enlarged perspective view of the self-locating spring divider.

The front equalizer plate 47 is substantially identical with the plate 48 except the arms, as seen in FIG. 2, have less total curvature. The peripheral flanges 53 of the pair of plates are suitably secured together, as by rivets 58 received in the openings 54. The plates of the equalizer 45 are journalled on the shoulders 26, 43 inside of the plates for equalizer 46 as seen in FIGS. 2 and 3. The elongated windows 55 of each pair of plates are axially aligned to receive a spring divider or separator 61. As more clearly shown in FIG. 8, the divider is formed of sheet metal bent into an elongated pin which is generally triangular in cross section. The pin has a curved base 62 and generally converging sides 63, the opposite ends of the sides being cut away at 64 to form a projection 65 from the base and adjacent portions of the arms. Each projection 65 of the pin is received in one of the pairs of axially aligned windows 55 with the base 62 located against the edge of the indentation 56 and the lower edge of the cut away portions 64 abutting the interior surface of the adjacent plate.

Two groups of spring sets 66, 67, 68 are positioned in the damper to engage the arms or sides 63, 63 of each divider 61, with spring sets 66 and 68 also abutting the diverging edges 35 of the hub arms 32, 39. The elongated openings or windows 55 allow limited movement of the dividers 61 as seen in FIG. 4, to compensate for any differences in spring set lengths. Thus, the dividers can relocate within the allowed movement to prevent uneven loading during operation. As shown in FIG. 4, each divider 61 has a limited length of movement in the window indicated at "X".

In operation, torque applied to the piston plate 11 due to engagement of the friction surface 12 with the interior surface of a torque converter housing causes rotation of the piston plate and drive tangs 17. The drive tangs move counterclockwise, as seen in FIG. 1, in the slots 44 relative to the hub arms 32, 39 to compress the springs 66; the curved edges 57, 57 of the equalizer plates allowing movement of the tangs into the space formed therebetween. Compression of springs 66 will cause the dividers 61 in equalizer 45 to move toward the far edge of the windows 55 away from springs 66, as seen in FIGS. 1 and 3, and causing rotation of the equalizer 45 to compress springs 67. Compression of the central springs cause movement of the spring dividers 61 in the equalizer 46 to the far edge of windows 55 therein away from springs 67 to cause rotation of the equalizer 46. Movement of this equalizer and associated dividers compresses the springs 67 to urge the arms 32, 39 of the hub assembly 22 to rotate, thus rotating the transmission input shaft. The curved edges 57 of the equalizer 46 form a space or slot to receive the hub arms 32, 39 therein upon rotation of the equalizer relative to the hub assembly.

Figure 9:
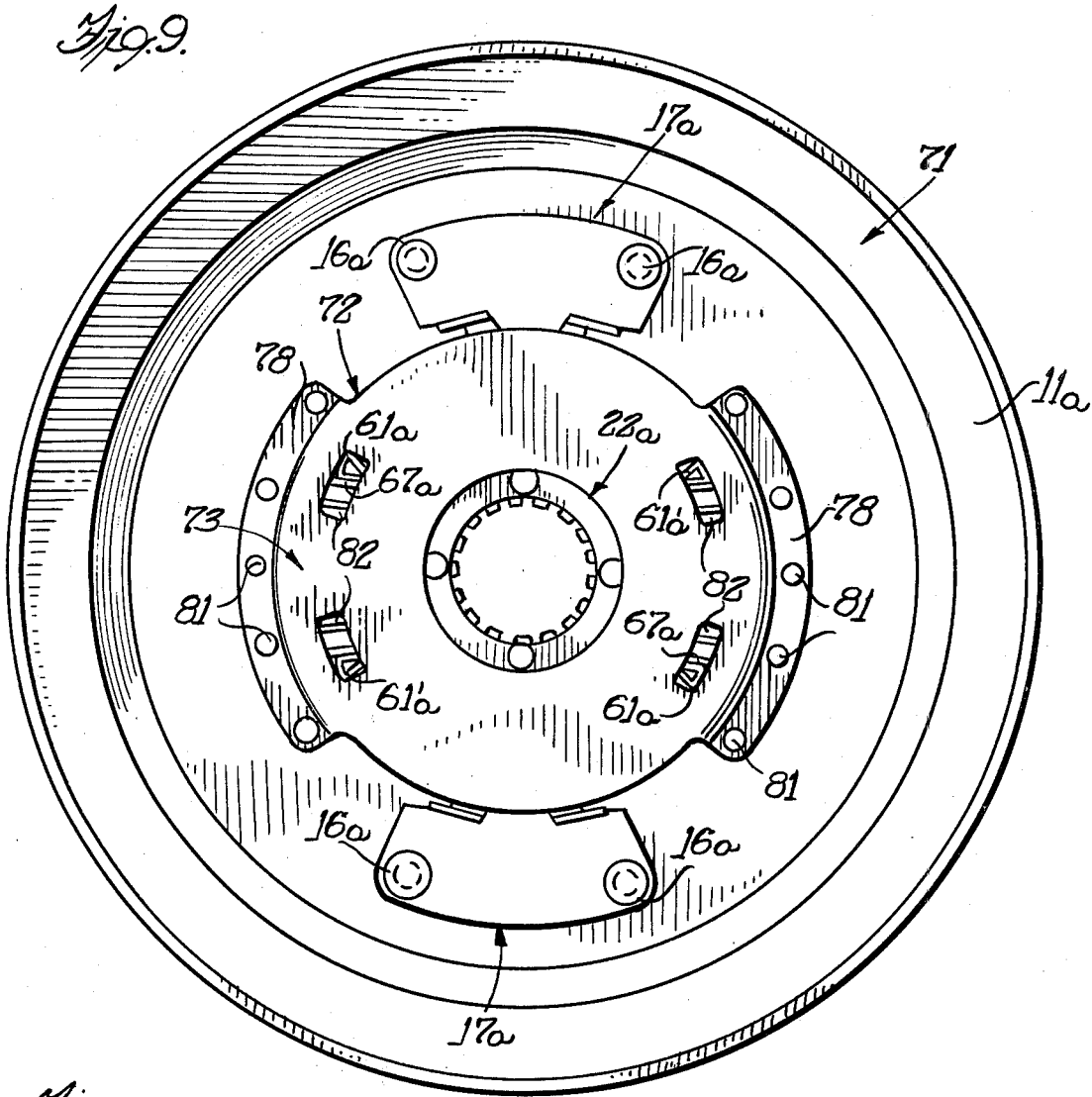
FIG. 9 is a rear elevational view of an alternate embodiment of vibration damper assembly connected to a piston plate.
Figure 10:
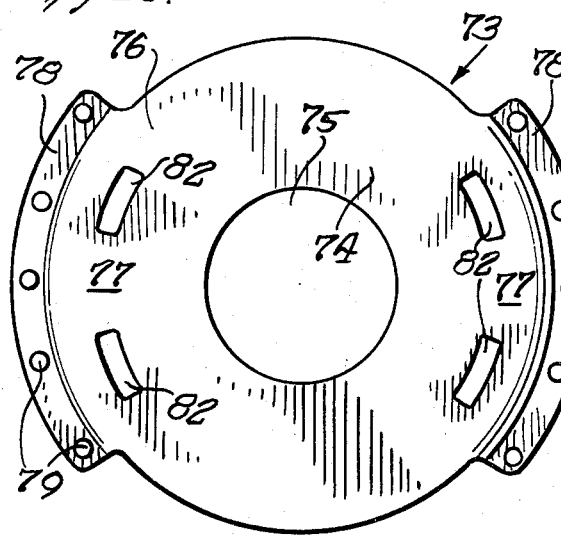
FIG. 10 is an elevational view of a plate forming one side of a floating equalizer.
Figure 11:
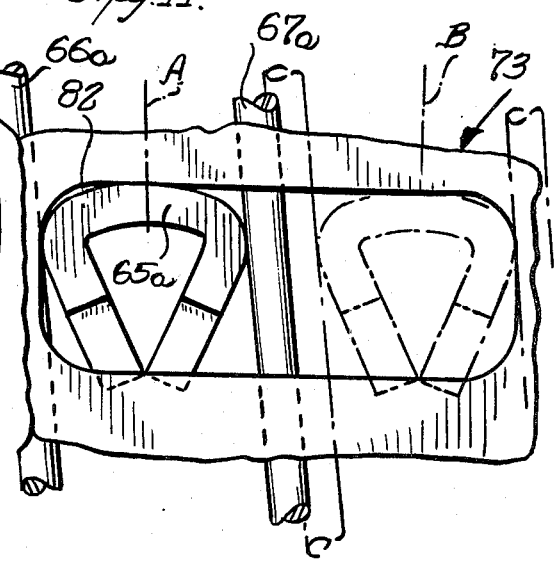
FIG. 11 is an enlarged partial elevational view of a self-locating divider in the equalizer.

FIGS. 9 through 11 disclose a second vibration damper assembly 71 wherein parts identical to those of FIGS. 1-8 have the same reference numeral with a script a. This assembly includes a piston plate 11a having drive tangs 17a secured thereto by rivets 16a, a hub assembly 22a including hub arms with circumferentially extending slots receiving the drive tangs and a single floating equalizer 72 journalled on the hub assembly. The equalizer comprises a pair of substantially identical plates 73, 73 forming the spring housing; the rear plate 73 being shown in FIGS. 9-11. This plate includes a flat annular body portion 74 having a central opening 75 journalled on the hub assembly 22a and a slightly outwardly and then inwardly curved portion 76 terminating in a pair of diametrically opposed curved arms 77 with radial flanges 78 having spaced openings 79 for rivets 81.

Located within the curved portion 76 are two pairs of elongated openings or windows 82; each pair of windows being diametrically opposed and positioned within the arc of the arms 77. Both the front and rear plates have the windows 82, which are axially aligned in the plates to receive the ends or projections 65a of a spring divider or separator 61a or 61a'. Each window allows an arc of movement of the divider between positions A and B as shown in FIG. 11. Thus, not only does the equalizer 72 float on the hub assembly 22a, but also movement of the spring dividers 61a, 61a' assists in the damping action.

When torque is applied through the piston plate 11a to the drive tangs 17a, rotation of the drive tangs in a counterclockwise direction, as seen in FIG. 9, compresses the damper springs 66a and urges the spring dividers 61a to move in the windows 82 from position A to position B to compress the springs 67a; with the springs 67a urging the second spring dividers 61a' against the edge of their associated windows to rotate the equalizer 72. Movement of dividers 61a' acts to compress the third set of springs which urges the hub assembly 22a to rotate and drive the output member. The damper will operate in the opposite direction under coast conditions for a vehicle.

We claim:

1. A torsional vibration damper assembly to transmit torque between driving and driven members, comprising an input member operatively associated with torque input means, a hub assembly operatively connected to torque output means and having a pair of oppositely extending radial arms, at least one floating equalizer journalled on said hub assembly, damper springs interposed between said hub arms and said equalizer, a pair of drive tangs secured to said input member and having inwardly extending projections extending into the path of and engaging said damper springs, each hub arm having a circumferentially extending slot therein receiving said drive tang projection, said equalizer providing substantially enclosed pockets for said damper springs and having axially aligned pairs of elongated windows therein, and a spring divider extending between and projecting into said axially aligned pairs of windows to separate adjacent damper springs, said windows allowing limited arcuate movement of said dividers in said equalizer.

2. A torsional vibration damper assembly as set forth in claim 1, wherein said spring divider is formed of an elongated sheet metallic member bent into a generally triangular shape as seen in cross section.

3. A torsional vibration damper assembly as set forth in claim 2, in which the end edges of the dividers are partially cut away to provide a portion projecting into each window and a shoulder engaging the equalizer body.

4. A torsional vibration damper assembly as set forth in claim 3, wherein a pair of floating equalizers are journalled on said hub assembly, each equalizer comprising a pair of generally parallel plates, each with a pair of oppositely disposed curved arms terminating in peripheral flanges secured together, each arm having an elongated window receiving one end of a spring divider.

5. A torsional vibration damper assembly as set forth in claim 4, in which an indented portion is formed in each equalizer plate in the curved portion radially outwardly of each window.

6. A torsional vibration damper assembly as set forth in claim 4, in which said windows allow for differences in spring set lengths.

7. A torsional vibration damper assembly as set forth in claim 3, in which said floating equalizer includes a pair of generally parallel annular plates having curved outer portions and joined together by pairs of oppositely disposed peripheral flanges, each said plate having two pairs of oppositely disposed elongated windows to receive the ends of said spring dividers.

8. A torsional vibration damper assembly as set forth in claim 7, wherein the windows of the two plates are axially aligned and of sufficient length to allow movement of the dividers to cause compression of the damper springs.

9. A torsional vibration damper assembly as set forth in claim 8, in which said damper springs are arranged in two groups acting in parallel with three spring sets in each group, the middle spring set of each group being positioned between and urging said spring dividers outwardly toward the far ends of the windows in the equalizers.

10. A torsional vibration damper assembly as set forth in claim 9, wherein a torque is applied through said drive tangs, both the equalizer and the spring dividers therein are capable of movement as the damper springs are compressed.

* * * * *